United States Patent
Odlyzko et al.

(10) Patent No.: US 9,635,680 B2
(45) Date of Patent: Apr. 25, 2017

(54) METHOD AND APPARATUS FOR MULTIPLEXING SIGNALS HAVING DIFFERENT PROTOCOLS

(75) Inventors: Paul Odlyzko, Arlington Heights, IL (US); Anthony Kobrinetz, Hoffman Estates, IL (US); Gary D. Schulz, Cary, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 923 days.

(21) Appl. No.: 11/617,270

(22) Filed: Dec. 28, 2006

(65) Prior Publication Data

US 2008/0159239 A1    Jul. 3, 2008

(51) Int. Cl.
*H04W 72/12* (2009.01)
*H04W 24/00* (2009.01)
*H04W 88/06* (2009.01)

(52) U.S. Cl.
CPC ........ *H04W 72/1215* (2013.01); *H04W 24/00* (2013.01); *H04W 88/06* (2013.01)

(58) Field of Classification Search
CPC .. H04W 24/00; H04W 72/1215; H04W 88/06
USPC ....... 370/464, 465, 466, 469, 474, 351, 389, 370/395.1, 395.4, 395.41, 498, 503, 507, 370/535, 310, 345, 347
See application file for complete search history.

(56) References Cited

U.S. PATENT DOCUMENTS

| | | | | |
|---|---|---|---|---|
| 5,732,076 A | * | 3/1998 | Ketseoglou et al. | 370/347 |
| 6,466,587 B1 | * | 10/2002 | Sugaya | 370/468 |
| 7,143,166 B1 | * | 11/2006 | Brassil | 709/226 |
| 2005/0058097 A1 | | 3/2005 | Kang et al. | |
| 2006/0002323 A1 | | 1/2006 | Hildebrand et al. | |
| 2006/0171345 A1 | | 8/2006 | Hildebrand et al. | |
| 2006/0193286 A1 | * | 8/2006 | Naghian et al. | 370/328 |
| 2007/0047432 A1 | * | 3/2007 | Cho | H04L 5/023 370/203 |
| 2007/0242692 A1 | * | 10/2007 | Limb et al. | 370/465 |

FOREIGN PATENT DOCUMENTS

WO    9716000    5/1997

OTHER PUBLICATIONS

Notification of the First Office Action, The State Intellectual Property Office of the People's Republic of China, Dec. 17, 2010, all pages.

* cited by examiner

*Primary Examiner* — Siming Liu
(74) *Attorney, Agent, or Firm* — Faegre Baker Daniels LLP

(57) ABSTRACT

A method and apparatus for multiplexing a plurality of communication signals where the communication signals may operate using different protocols is provided. A communication node (102) that is a part of a communications system or network (100) is provided. The access point includes a transceiver (202, 204) for transmitting and receiving a first signal and a second signal wherein the first signal (410) is using a first protocol and the second signal (412) using a second protocol. The access point also includes a scheduler (208) for scheduling a transmit time for the first signal and for the second signal within a first frame (402, 404) and a receiving time for the first signal and for the second signal within a second frame (406, 408). A multiplexer (210) is also provided where the multiplexer combines the first signal and second signal in the first and second frames according to the scheduled transmit time and receive time.

26 Claims, 3 Drawing Sheets

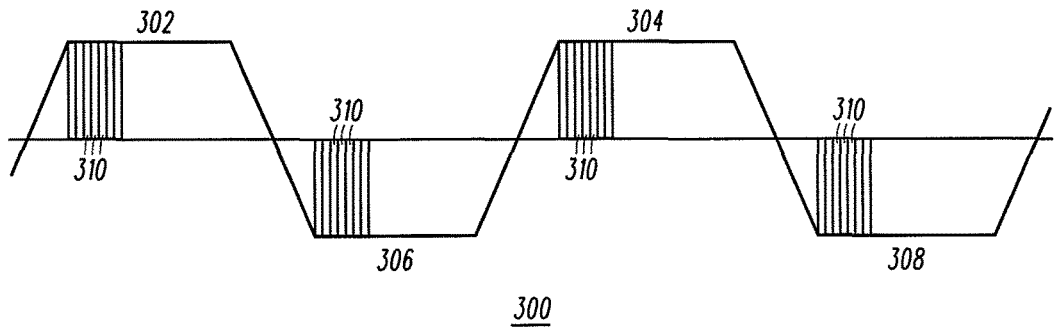
FIG. 3 — PRIOR ART —
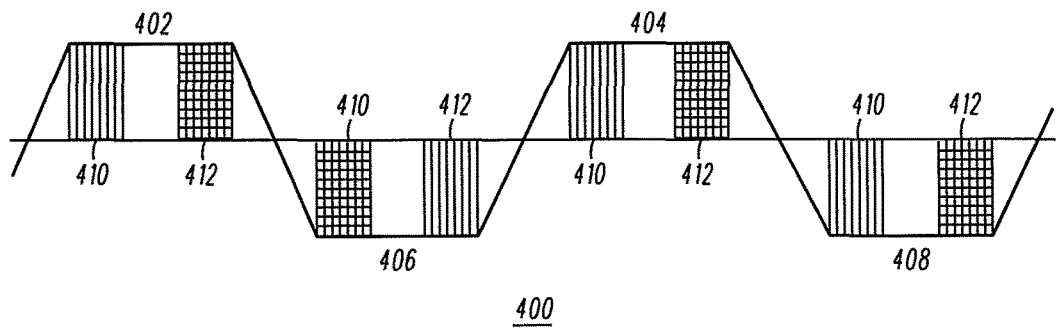
FIG. 4
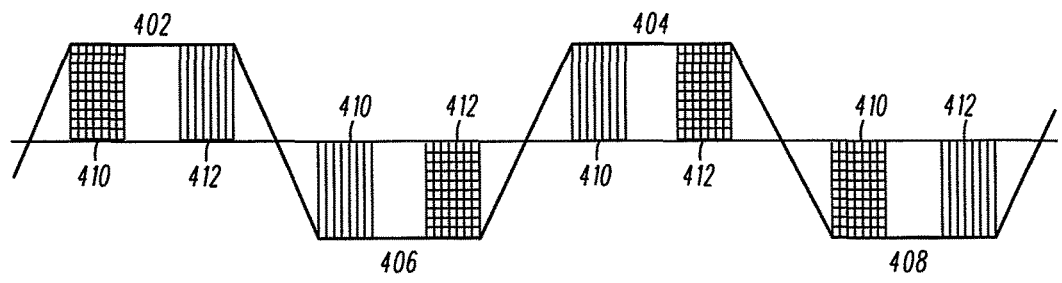
FIG. 5

METHOD AND APPARATUS FOR MULTIPLEXING SIGNALS HAVING DIFFERENT PROTOCOLS

FIELD OF THE INVENTION

The present invention relates generally to an access point in an orthogonal frequency division multiplexed system and in particular to a communication node that multiplexes signals that use different protocols.

BACKGROUND

Public and private networks, which can based on standard or proprietary protocols, operate for a given set of users that subscribe to the network. Users and network operators are required to acquire, either by purchase or lease, specialized equipment such as communication nodes and subscriber units to operate in these various networks. Communication nodes include base stations and access points that transmit signals to and receive signals from subscriber units so that the subscriber units can communication with one another as well as other communication nodes. The communication nodes can also provide access to other networks from which the subscriber units can be provided signals.

The networks that use this various equipment can include wide area networks (WANs) and local area networks (LANs), including wireless LANs (WLANs,) that each operate according to the different protocols. These different protocols can include Global System of Mobile Communication (GSM), Time Division Multiple Access (TDMA), Code Division Multiple Access (CDMA), CDMA2000, Wideband CDMA (W-CDMA) and Universal Mobile Telecommunication System (UMTS), Orthogonal Frequency Division Multiplex (OFDM) as well as protocols that abide by IEEE 802.xx standards, such as IEEE 802.16.

As the networks improve, it becomes more and more necessary for a network that uses one protocol to be able to provide access to devices that operate according to a different protocol. In such a situation, a network operator installs various communication nodes as a part of the network infrastructure. These communication nodes provide network access using a first protocol and provide access to subscriber units that operate using that first protocol. In order to improve service and to take advantage of the developments provided in new technologies, network operators may upgrade communication nodes that operate using different protocols than those originally provided. It is also possible for the network operators to install new communication nodes using the new protocol that operate along side the communication nodes that use the old protocol. The network users, however, may still be using equipment that operate using the old protocol and may not be willing or able to replace the subscriber units to therefore easily operate using the new communication nodes. Nonetheless, the users may want to be able to take advantage of some of the new features and capabilities of provided by the new protocol. Thus, new communication nodes need to be backwards compatible with older equipment.

In addition, technical innovations as seen in the progression of new protocols introduce issues that may not always be backward compatible such that a device that operates according to a first protocol may no longer be able to work on the network where the protocol has been modified into a second protocol. This is also true with respect to different aspects of the protocol including medium access. Replacement of older systems with new systems that require new communication nodes can be associated with service disruptions, time delays and other costs.

Continued development of OFDM technology for wireless access raises the prospects of wide availability of low-cost subscriber units that are capable of operating in the same frequency range as subscriber units that operate on other networks such as Canopy systems, which is provided by Motorola, Inc. of Schaumburg, Ill. There is a need to offer access and to provide connectivity to a mixed population of subscriber units that use one protocol and subscriber units that use another protocol based on OFDM technology.

In view of the foregoing, there is a need to address the issues raised by a subscriber unit roaming into a cell that is services by a communication node where the subscriber unit uses a protocol similar to but not completely compatible with the protocol used by the communication node. It is also possible for a low cost subscriber unit that will close the gap between the linear and frequency modulation radios that need to be backwards compatible with networks. It may not be possible, however, to provide services for these users that require backward compatibility by reserving channels for the very low-traffic-density populations of subscriber units because it will utilize available spectrum capacity that would be better utilized by the new protocols. In addition, issues exist when transitioning between the new and old protocols relating to the service disruptions, delays and costs. Accordingly, there is a need to provide a time multiplexing of communication system that deploy distinct interfaces and protocols while sharing the same physical communication medium. There is also a need to provide multi-protocol communication nodes capable of communicating with devices that support different air interfaces and protocols.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 3 is an illustration of transmit and receive frames according to an embodiment of the prior art.

FIG. 4 is an illustration of transmit and receive frames scheduled and multiplexed according to an embodiment of the present invention.

FIG. 5 is an illustration of transmit and receive frames scheduled and multiplexed according to another embodiment of the present invention.

Figure 1:
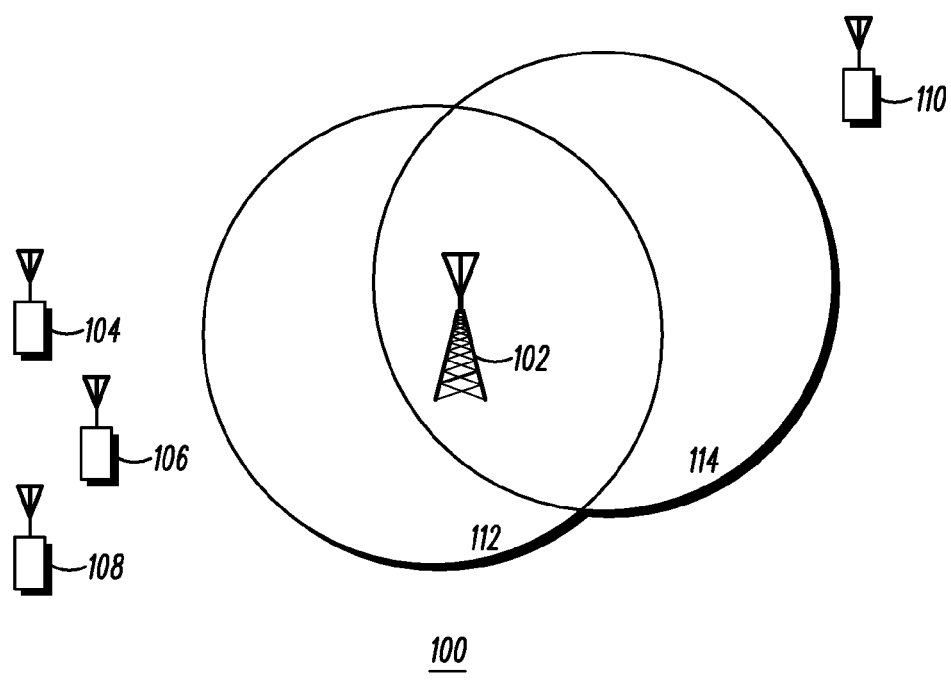
FIG. 1 is a block diagram of a communication system including communication nodes operating in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to multiplexing signals using different protocols. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a method and apparatus for multiplexing signals using different protocols as described herein. The non-processor circuits may include, but are not limited to, a radio receiver, a radio transmitter, signal drivers, clock circuits, power source circuits, and user input devices. As such, these functions may be interpreted as steps of a method to multiplex signals using different protocols. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention is directed to a method of multiplexing a plurality of communication signals where the communication signals may operate using different protocols. The method begins by detecting a first signal wherein the first signal operates using a first protocol and detecting a second signal wherein the second signal operates using a second protocol. The method continues by scheduling transmit and receive times of the first signal and second signal within a frame that will include both the first and second signals. The first and second signals are then multiplexed in the frame according to the schedule. The frame is therefore time division multiplexed.

In an embodiment, the method also includes adjusting the transmit and receive times within the frame for the first signal and the second signal. Accordingly, the transmit and receive times in one frame may be different than the transmit and receive times for another frame. In another embodiment, the step of scheduling transmit and receive times comprising mapping of time slots within the frame for the first signal and the second signal. Alternatively, it may be necessary to estimate an amount of time necessary for the first signal and for the second signal within the frame. It is an object of scheduling the transmit and receive times to utilize the entire spectrum of the frame. Moreover, scheduling the times can used in both a downlink and an uplink map.

The method of this embodiment may also include synchronizing a plurality of the frames with one another. In order to synchronize the plurality of frames the present invention may use a common clock reference such as one that would be provided by global positioning services (GPS).

In another embodiment of the present invention an access point or communication node that is a part of a communications system or network is provided. The access point includes a transceiver for transmitting and receiving a first signal and a second signal wherein the first signal is using a first protocol and the second signal using a second protocol. The access point also includes a scheduler for scheduling a transmit time for the first signal and for the second signal within a first frame and a receiving time for the first signal and for the second signal within a second frame. A multiplexer is also provided where the multiplexer combines the first signal and second signal in the first and second frames according to the scheduled transmit time and receive time.

The access point may also include a synchronizer that synchronizes a plurality of frames to be transmitted by the transceiver. The synchronizer may also synchronize transmit and receive times for signal transmitted and received at the access point. As with the method described above, the frames that are multiplexed with the first and second signals may be a downlink map and an uplink map for at least one of the first signal and the second signal. The scheduler may also adjust the transmit time and the receive time for the first signal and the second signal between a plurality of frames.

In an alternative embodiment, communication node or an access point can be provided where the communication node includes a transceiver that transmits and receives signals using one of a first protocol and a second protocol. The communication node also includes a scheduler that schedules a transmitting frame having a first portion and a second portion. The first portion is for transmitting a signal using the first protocol and the second portion for transmitting a second signal using the second protocol. The scheduler also schedules a receiving frame having a first portion and a second portion where the first portion is for a signal using the first protocol and the second portion is for a signal using the second protocol. A multiplexer is provided to combine the first signal and second signal in the transmitting frame and in the receiving frame. The scheduler adjusts the transmit time and the receive time for the first signal and the second signal between a plurality of frames. The schedulers can also schedule the transmitting frame and the receiving frame for a first communication network operating with the first protocol and a second communication network operating with the second protocol. Like the other embodiment of the access point, a synchronizer that synchronizes the transmit and receive times can be provided. In addition, the frame can have a downlink map and an uplink map for at least one of the first signal and the second signal. It is an objective of the access node for the scheduler to utilize the spectrum of the frame.

Turning to FIG. 1, a communication network 100 is provided. The communication network 100 is capable of operating using different processing protocols that can be any of the known time-division duplex technologies including GSM, UMTS, OFDM, and 802.16 protocols. As seen, a communication node 102 is provided within the network. The communication node 102 can be an access point or a base station that transmits and receives signals with a plurality of different subscriber units 104-110. Subscriber units 104-110 can be one of a number of devices including cell phones, laptop computers, personal computers, personal digital assistants and other known mobile devices or communication nodes.

The communication node 102 operates within the system 100 such that it transmits and receives signals within a given area known as a cell 112, 114. In an embodiment of the present invention, the communication node is capable of operating according to more than one protocol such that both protocols available within the cells 112, 114. In another embodiment, a second communication node (not shown) is positioned in the same general vicinity as communication node 102. In this situation, the communication node 102 operates according to a first protocol while the second communication node may operate according to a second protocol. As the communication node operates using at least two different protocols, the communication node can provide network access to subscriber units 104, 106 that operate using the first protocol and subscriber units 108, 110 that operating using the second protocol. Accordingly, the communication node can provide network access to a variety of subscriber units regardless of how the subscriber units are configured.

Figure 2:
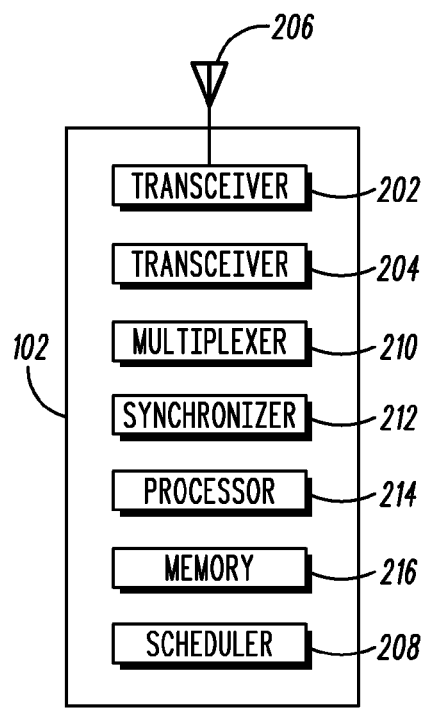
FIG. 2 is a block diagram of the communication node operating in accordance with some embodiments of the present invention.

FIG. 2 shows a communication node 102 that is configured according to an embodiment of the present invention where the elements of the communication node 102 that are needed to understand the scope of the present invention are described with the knowledge that other elements may be necessary for the complete operation of the node. Communication node 102 includes a transceiver 202 that operates to transmit and receive signals between the node 102 and the subscriber units 104-110. The transceiver 202 can be configured to operate according to any one of the different network protocols. A second transceiver 204 can also provided that also transmits and receives signals between the node 102 and the subscriber units 104-110 according to another of the different network protocols. The communication node therefore provides access to the cells 112, 114 according to at least two different network protocols. In an alternative embodiment, the communication node 102 includes one transceiver that operates according to a first protocol, and a second communication node (not shown) is provided that one transceiver that operates according the second network protocol. The two communication nodes are arranged together such that they can provide access to the subscriber units 104-110 that use different network protocols and such that they communication with one another. The transceivers 202, 204 are coupled to an antenna 206 that transmits the signals to and receives the signals from the subscriber units 104-110.

The communication node 102 also includes a scheduler 208 that can be coupled to the transceiver. In accordance with an embodiment of the invention, the scheduler 208 determines transmit times for a signal using the first protocol and a signal using the second protocol within a transmit frame. The scheduler 208 also determines a receive time for signal using a first protocol and a signal using a second protocol within a receive frame. The transmit times and receive times can be scheduled regardless of the protocol and in such a manner that the frames include frames that are transmitting and receiving signals using more than one different protocol. The scheduler 208 can be configured to send a downlink and an uplink map for devices as specified by IEEE 802.16 standard as well as for the communication nodes that operate in according to the IEEE 802.16 mode during the required portions of the frame. Upon receipt of a downlink map, an IEEE 802.16 subscriber unit interprets the map as defined by the standard and receives and transmits frames accordingly. The scheduler 208 can identify time periods within the frame where they may be conflicts between the transmit and receive frames as well as transmission of frames between the first protocol and the second protocol.

A multiplexer 210 is provided to multiplex the signals using the first protocol and the second protocol within the same frame. Accordingly, a frame can configured to have a first portion that transmits a signal using a first protocol multiplexed with a second portion that transmits a signal using a second protocol. In addition, a frame can be configured to have a first portion that receives a signal using a first protocol multiplexed with a second portion that receives a signal using a second protocol.

In addition, the communication node 102 can be configured with a synchronizer 212. The synchronizer 212 is arranged to avoid the situation where the one of the transceivers 202, 204 is transmitting a signal according to the first protocol while the other transmitter 202, 204 is receiving a signal according to the second protocol. In an embodiment, the synchronizer 212 can use a positioning technology such as GPS to synchronize the frames for different subscriber units 104-110. The GPS technology provides a common clock reference that allows the base stations to synchronize without explicit co-ordination. For example, if the frame rate is 200 per second and the accepted convention in the system is that a one-second "tick" begins a downlink frame in one of the protocols based upon the "tick," the communication nodes can be synchronized. According to the principles of the invention, one transceiver in a communication node does not transmit while another transceiver is trying to receive information from a communication node or subscriber device. It is also important to avoid having one communication node receiving while a co-channel transceiver on another communication node is transmitting.

A processor or controller 214 and memory 216 are also provided as a part of the communication node 102. These components 214, 216 are coupled to the transceivers 202, 204, antenna 206, scheduler 208, multiplexer 210 and synchronizer according to known practices for the communication node 102 to operate according to the first and second protocols for communication between multiple communication nodes 102, subscriber units 104-110 and other communication equipment used by the network 100 and other communication systems.

FIG. 3 illustrates a series of frames 300 sent between a communication node 102 and subscriber units 104-110 according to the prior art where the frames are used for just one protocol. The format shown in the figure is used for the transmission of frames according the a classic Canopy system. The series of frames 300 include downlink frames 302, 304 with uplink frames 306, 308 interleaved between the downlink frames 302, 304. The time span between the beginning of a first downlink frame 302 and a second downlink frame, including the uplink frame 306, can be in the range of 2.5 msec. The arrangement of frames is a time division duplex type. Within the time span of the frames, the downlink and uplink portions can be configurable according to an adjustable ratio. In addition, packets 310 sent as a part of the frames 302-308 can be of fixed length. The packets include control packets and are configured for fragmentation and reassembly by the communication node 102 and the subscriber units 104-110. The fixed length packets can also be ARQ enabled for error recovery.

FIG. 4 illustrates a series of frames 400 according to an embodiment of the present invention. The series of frames 400 includes a plurality of downlink frames 402, 404 that are sent from a communication node 102 to subscriber units 104-110 as well as a plurality of uplink frames 406, 408 that are sent from the subscriber units 104-110 to the communication node 102. Each of the downlink frames 402, 404 and uplink frames 406-408 include a first portion 410 and a second portion 412. Either of the first portion or the second portion can include packets or data configured in other manners according to different protocols. Thus, the first portion of each frame can be configured using a first protocol and the second portion can be configured using a second protocol. In the embodiment shown in FIG. 4, the first portion is for single link frames, like those used in Canopy networks, while the second portion is used for multilink frames such as those used IEEE 802.16 type protocols. According to the principles of the present invention, the scheduler defines the times within each of the frames for the first portion 410 to handle the first protocol and the second portion 412 to handle the second protocol.

As the frames 402-408 are designed to be compatible with Time Division Duplex frames used in various networks, the time span of the frames can be consistent as with frames 302-308 such that the time span of the downlink and uplink frames is 2.5 msec. It is also possible to vary the length of the time between the beginning of a downlink frame to the next downlink frame and to increase it to at least 5 msecs. As with the time span, the frames 402-408 are consistent with other aspects of Time Division Duplex frames and also can be synchronized using synchronizer 212 and can use GPS technology to provide a common clock reference. Within each of the frames 402-408, the first portion 410 and the second portion 412 can be offset from one another.

The first portion 410 and the second portion 412 of the frames 402-408 are configurable according to the needs of the downlink and uplink maps the time span of the frames and other criteria. Accordingly, the ratio of the time period of the first portion 408 to the second portion 408 can vary according to the needs of a communication session between a communication node 102 and subscriber units 104-110. In addition, the ratio of time and space for the first portion 410 and the second portion 412 within a frame 402-408 can vary. Thus, the first portion in a downlink frame 402 can have a different allocation than the first portion in an uplink frame 406. In addition the first portion in a first downlink frame 402 can have a different allocation than the first portion of a second downlink frame 404. In an embodiment, the configuration of the first portion and the second portion utilizes the entire spectrum of the frame.

Turning to FIG. 5, a further embodiment of how frame 402-408 can be configurable is shown. In this embodiment, the first portion of the downlink frames 402, 404 are configured for a first protocol and the second portions are configured for a second protocol. In the uplink frames 406, 408, however, the first portions are configured for the second protocol and the second portions are configured for the first protocol. As seen in more detail in the figure, this configuration arranges the portions of the frames, i.e. the first portion of the downlink frame 402, 404 with the second portion of the uplink frame 406, 408 and the second portion of the downlink frame 402, 406 with the first portion of the uplink frame 406,408, to be configured adjacent to one another.

Figure 6:
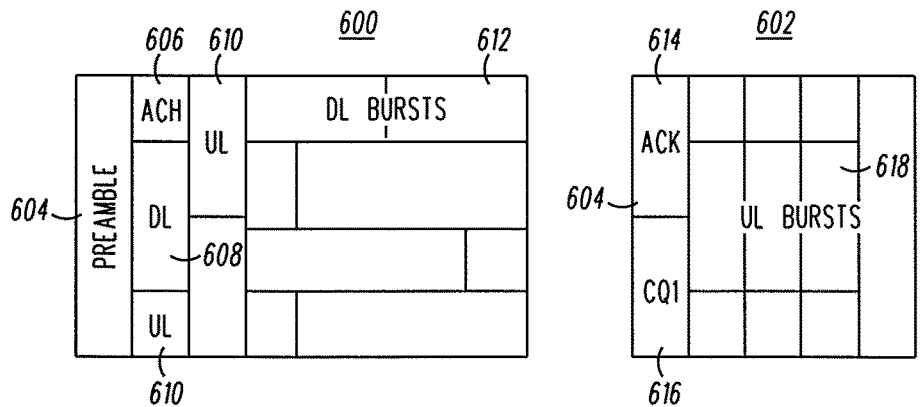
FIG. 6 is a block diagram of the components of a frame in accordance of the present invention.

As stated, the downlink and uplink frames 402-408 are configurable. FIG. 6 illustrates a downlink subframe structure 600 and uplink subframe structure 602 that are arranged to configure the frames 402-408 according to the different embodiments shown in FIGS. 4 and 5 and other desirable arrangements. The subframe structure shown can be for an OFDM communication session or a single carrier communication session between the communication node 102 and the subscriber units 104-110 such that the periodicity of the frame can be comprised of the downlink and uplink segments. The downlink structure 600 includes a preamble 604 and a forward channel (FCH) block that are a standard component for downlink frames according to OFDM or single carrier protocols in accordance with IEEE 802.16 standards. The downlink structure 600 also includes a downlink map portion 606 and an uplink map portion 608 that inform the downlink and uplink frames 402-408 of the configuration of each frames. The allocation of the first portion 410 and the second portion 412 are included as a part of the downlink and uplink map portions 606, 608. The downlink and uplink maps also define the burst regions 610, 612 of the downlink subframes and uplink subframes, respectively. Accordingly, the various burst regions 610 within the downlink subframe can be used as a part of the first portion 410 and second portion 412 of the downlink frames. Likewise the burst regions 612 within the uplink subframe can be used for the first portion 410 and the second portion 412 of the uplink frames. The uplink frames can include other data portions that are a part of the IEEE 802.16 standards including an acknowledgement (ACK) portion 614 and channel quality index portion 616 that are used as a part of the session between the node 102 and the units 104-110. A ranging channel 618 can also be configured in the uplink subframe.

According to this arrangement of subframes, the format of the uplink subframe is defined by the uplink map found in the downlink map. The communication node 102 configures the downlink frame to notify the subscriber units 104-110 of the format of the frames including the uplink map. Therefore, the subscriber units 104-110 are notified of the configuration of how to continue the session with the communication node such that they know the first portion and the second portion of the frames and which of these portions is for a first protocol and which is for the second protocol.

Figure 7:
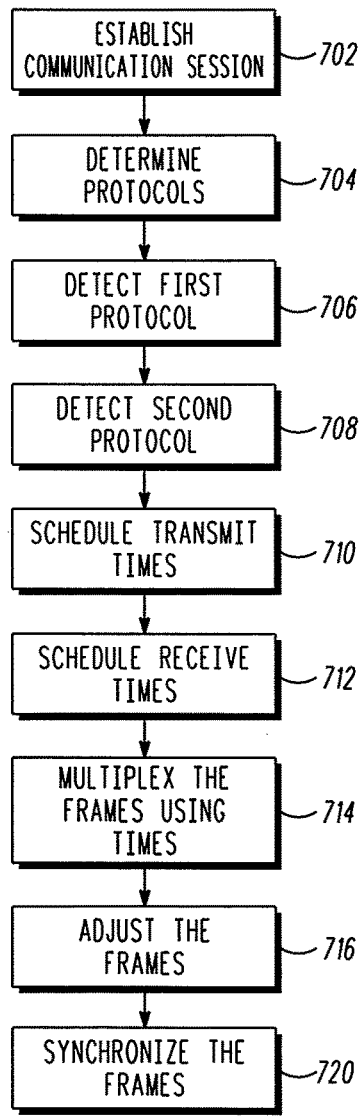
FIG. 7 is a flow chart describing the operation of the present invention.

FIG. 7 is a flow chart 700 describing the operation of the present invention. As described above, a communication node 102 is a part of a communication network in which at least two different protocols are operating and where the second protocol is not necessarily backwards compatible with the first protocol. Thus, the communication node 102 can have at least two different transceivers 202, 204 in order to establish and maintain a communication session with subscriber units 104-110 that use either the first or the second protocol. The communication node establishes 702 communication sessions with the subscriber units and determines 704 that there are different protocols that are in play with the different subscriber units. In an embodiment, that communication node detects 706 the first protocol for the first signal being used and detects 708 the second protocol for the second signal being used. As the downlink frames 402, 404 and uplink frames 406, 408 are to be used for both protocols, the scheduler 208 schedules 710 the transmit times to be used within the frames 402-408. In addition, the scheduler 208 schedules 712 the receive times to be used within the frames 402-408. The transmit and receive times can be for the downlink and uplink maps.

These times can vary between the frames such that the first portion in the downlink frames can be used for either the first protocol or the second protocol and second portion will be used for the other protocol. Likewise the first portion of the uplink frames can be used for either the first protocol or the second protocol and the second portion will be used for the other protocol. The arrangements of the protocols within the frames can be seen in FIGS. 4 and 5. The multiplexer 210 proceeds to multiplex 714 the first portion and the second portion of the downlink frames according to what has been scheduled.

In an embodiment of the present invention, the transmit and receive times within the frames can be adjusted 716 for the first signal and the second signal. Accordingly, the transmit and receive times in one frame may be different than the transmit and receive times for another frame. In another embodiment, the step of scheduling transmit and receive times comprising mapping of time slots within the frame for the first signal and the second signal. The determined mapping may be included as a part of the downlink map and uplink map found in the downlink subframes. As a part of the mapping, it may be necessary to estimate the amount of time necessary for the first signal and for the second signal within the frame. It is an object of scheduling the transmit and receive times to utilize the entire spectrum of the frame. Moreover, scheduling the times can used in both uplink and a downlink map.

The method of this embodiment may also include synchronizing 720 a plurality of the frames with one another. In order to synchronize the plurality of frames, the synchronizer 212 may use global positioning services (GPS), to determine the common clock reference for the sources of the first signal and the second signal.

In view of the foregoing, the present invention provides a backwards compatible model when a network operator has installed a first system with subscriber devices that operate in the field and then upgrades the communication nodes to abide by OFDM standards and IEEE 802.16 compliant. According to the principles of the present invention, the communication node is able to multiplex transmit and receive signals to different subscriber devices within frames. In both the downlink and uplink communications, the present invention combines two signals that use different network protocols including OFDM signaling. The order of signals in each of the frames is not necessarily relevant because the downlink and uplink maps can define the start and stop times of each of the transmit and receive times in a frame. In addition, these start and stop times can vary between frames. The subscriber devices and communication nodes know the correct transmit and receive times for the frame according the mapping provided.

The frames of the present invention are Time Division Multiplexed. Within each time division multiplexed frame, the can be either a multilink component, for OFDM and 802.16 type communications, and single frame communication. The communication node controls how to allocate these time frames within the multiplexed frames. The communication node can estimate or otherwise decide how much time in the radio mode interface and with the multi-carrier interface each protocol needs. Likewise, the amount of time in the downlink and uplink frames can be decided or estimated by the communication node. By estimating and mapping the transmit and receive times, a communication node can identify contentious times of transmission and avoid those times. In addition, the communication node can fully utilize the time within a frame for omni-directionally radiating transmissions and directional transmissions thereby avoiding underutilization of the available transmission spectrum.

The Time Division Multiplexed frames can accommodate both omnidirectional and non-omnidirectional protocols. The communication node therefore avoids a situation in which one radio is transmitting while another radio in the same vicinity is trying to receive. Accordingly, the communication node attempts to synchronize the transmit and receive times across a number of communication nodes in the same vicinity or in a logical cluster. This is possible because each of the frames is configurable. The factors that are considered in configuring the frames include but are not limited by the number of subscriber devices that are supporting each interface and the level of utilization, e.g. the amount of traffic, that is required by each protocol.

The communication node of the present invention has a receiver that is capable of decoding signals generated by subscriber devices that operate according to differing and not necessarily compatible protocols. In addition, the communication node can operate according to the principles outlined here regardless of the type of protocols used. The communication node exercises control over timing of transmissions by various communication equipment by using repetitive frame scheduling or issuing clear-to-send messages.

The multi-protocol communication node is capable of co-ordinating, scheduling and controlling multiple systems. It schedules transmit and receive times for the communication node under its control as well as the subscriber devices. This prevents the various communication devices from transmitting during times allocated to other devices. The multi-protocol communication node transmits at times specified directly by a network operator or as directed by a default setting. The messages that are transmitted are appropriate to any air interface or protocol that the multi-protocol communication node supports and are sufficient to allow the subscriber devices and other communication nodes within the communication range to respond and register with the communication node.

In an implementation example, the evolution of Canopy systems calls for increasing data rates. OFDM systems is a proven method for increasing the data rate above what can be done with 2FSK or 4FSK embodiments when the received signal is sufficient strong and also experiencing low level interference. A deployed Canopy system can add capacity by adding new OFDM capable communication nodes close to an existing Canopy access point without affecting the subscriber devices and communication nodes operating further away from the access point. The communication nodes incorporating the principles of the present invention are the only changes that are necessary in the system, and there is no requirement for addition RF bandwidth.

Accordingly, the communication scheduler sends a downlink and uplink information in a way that is understandable to the subscriber devices such as by way of downlink and uplink maps. The communication node then switches between the two different protocols during the scheduled portions of the frame for the protocols. The subscriber devices interpret the received maps as defined in the respective protocol specification and receive and transmit accordingly.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of multiplexing a plurality of communication signals comprising:
    detecting a first signal at a communication node wherein the first signal operating according to a first network protocol;
    detecting a second signal at the communication node wherein the second signal operating according to a second network protocol;
    scheduling transmit times of the first signal operating according to the first network protocol and second signal operating according to the second network protocol within a single uplink frame for the communication node;
    scheduling receive times of the first signal operating according to the first network protocol and second signal operating according to the second network protocol within a single downlink frame for the communication node; and
    multiplexing the first signal operating according to the first network protocol and second signal operating according to the second network protocol in the single uplink frame and the single downlink frame according to scheduled transmit times and receive times, and
    wherein the transmit and receive times of the multiplexed first and second signals in the single uplink frame and the single downlink frame are synchronized between the communication node and another communication node.

2. The method of claim 1 further comprising adjusting the transmit and receive times for the first signal and the second signal within the uplink and downlink frames.

3. The method of claim 1 wherein scheduling transmit and receive times comprising mapping of time slots within the uplink and downlink frames for the first signal and the second signal.

4. The method of claim 1 wherein scheduling transmit and receive times comprising estimating an amount of time for the first signal and for the second signal within the uplink and downlink frames.

5. The method of claim 1 wherein scheduling transmit and receive times utilizes an entire spectrum of the uplink and downlink frames.

6. The method of claim 1 wherein scheduling comprises using uplink and a downlink map.

7. The method of claim 1 further comprising synchronizing a plurality of the uplink and downlink frames.

8. The method of claim 7 wherein synchronizing the plurality of frames comprises using positioning technologies to determine a common clock reference for the sources of the first signal and the second signal.

9. The method of claim 1 wherein the first and second network protocols are different network protocols, each of which is selected from time-division duplex technologies including GSM, UMTS, OFDM and IEEE 802.16 protocols.

10. The method of claim 1 wherein the first and second network protocols are selected from one of: two different wide area network (WAN) protocols, two different local area network (LAN) protocols, or a WAN protocol and a LAN protocol.

11. A communication node in a telecommunications system comprising:
    a transceiver for transmitting and receiving a first signal and a second signal wherein the first signal is operating according to a first network protocol and the second signal is operating according to a second network protocol;
    a scheduler for scheduling a transmit time for the first signal operating according to the first network protocol and for the second signal operating according to the second network protocol within a single uplink frame and a receiving time for the first signal operating according to the first network protocol and for the second signal operating according to the second network protocol within a single downlink frame; and
    a multiplexer to combine the first signal operating according to the first network protocol and second signal operating according to the second network protocol in the single uplink and downlink frames according to the scheduled transmit time and receive time wherein the transmit and receive times of the multiplexed first and second signals in the single uplink frame and the single downlink frame are synchronized between the communication node and another communication node.

12. The communication node of claim 11 further comprising a synchronizer to synchronize a plurality of frames to be transmitted by the transceiver.

13. The communication node of claim 11 further comprising a synchronizer to synchronize transmit and receive times for signal transmitted and received at the communication node.

14. The communication node of claim 11 wherein the uplink and downlink frames each having an uplink map and a downlink map for at least one of the first signal and the second signal.

15. The communication node of claim 11 wherein the scheduler utilizes the spectrum of the uplink and downlink frames.

16. The communication node of claim 11 wherein the scheduler adjusts the transmit time and the receive time for the first signal and the second signal between a plurality of frames.

17. The communication node of claim 11 wherein the first and second network protocols are different network protocols, each of which is selected from time-division duplex technologies including GSM, UMTS, OFDM and IEEE 802.16 protocols.

18. The communication node of claim 11 wherein the first and second network protocols are selected from one of: two different wide area network (WAN) protocols, two different local area network (LAN) protocols, or a WAN protocol and a LAN protocol.

19. A communication node in a communications network wherein the communication node comprising:

a transceiver for transmitting and receiving signals using one of a first network protocol and a second network protocol;

a scheduler for scheduling a single uplink frame having a first portion for transmitting a first signal using the first network protocol and a second portion for transmitting a second signal using the second network protocol and scheduling a single downlink frame having a first portion for receiving a third signal using the first network protocol and a second portion for receiving a fourth signal using the second network protocol; and a multiplexer to combine the first signal using the first network protocol and second signal using the second network protocol in the single uplink frame and to combine the third signal using the first network protocol and the fourth signal using the second network protocol in the single downlink frame wherein the transmit and receive times of the multiplexed first and second signals in the single uplink frame and the single downlink frame are synchronize between the communication node and another communication node.

20. The communication node of claim 19 further comprising a synchronizer to synchronize transmit and receive times for signal transmitted and received at the access point.

21. The communication node of claim 19 wherein the frame having an uplink map and a downlink map for at least one of the first signal and the second signal.

22. The communication node of claim 19 wherein the scheduler utilizes the spectrum of the frame.

23. The communication node of claim 19 wherein the scheduler adjusts the transmit time and the receive time for the first signal and the second signal between a plurality of frames.

24. The communication node of claim 19 wherein the scheduler schedules the uplink frame and the downlink frame for a first communication network operating with the first network protocol and a second communication network operating with the second network protocol.

25. The communication node of claim 19 wherein the first and second network protocols are different network protocols, each of which is selected from time-division duplex technologies including GSM, UMTS, OFDM and IEEE 802.16 protocols.

26. The communication node of claim 19 wherein the first and second network protocols are selected from one of: two different wide area network (WAN) protocols, two different local area network (LAN) protocols, or a WAN protocol and a LAN protocol.

* * * * *